US012786757B2

(12) United States Patent
Vejlgaard et al.

(10) Patent No.: US 12,786,757 B2
(45) Date of Patent: Nov. 3, 2026

(54) LOW ENERGY INDICATION FOR INTERNET OF THINGS DEVICES

(71) Applicant: Nokia Technologies Oy, Espoo (FI)

(72) Inventors: Benny Vejlgaard, Gistrup (DK); Nuno Manuel Kiilerich Pratas, Aalborg (DK); Thomas Haaning Jacobsen, Nørresundby (DK); Oana-Elena Barbu, Aalborg (DK); Johannes Harrebek, Aalborg (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 18/794,416

(22) Filed: Aug. 5, 2024

(65) Prior Publication Data

US 2025/0056261 A1 Feb. 13, 2025

Related U.S. Application Data

(60) Provisional application No. 63/518,459, filed on Aug. 9, 2023.

(51) Int. Cl.
*H04W 24/04* (2009.01)
*H04W 4/90* (2018.01)

(52) U.S. Cl.
CPC ............. *H04W 24/04* (2013.01); *H04W 4/90* (2018.02)

(58) Field of Classification Search
CPC ................................ H04W 24/04; H04W 4/90
USPC .......................................................... 370/259
See application file for complete search history.

(56) References Cited

U.S. PATENT DOCUMENTS

| | | | | |
|---|---|---|---|---|
| 9,271,242 | B2 * | 2/2016 | Vannithamby | H04L 1/1861 |
| 2011/0175461 | A1 * | 7/2011 | Tinaphong | H02J 50/27 307/149 |
| 2015/0334614 | A1 * | 11/2015 | Banks | H04W 36/0094 455/444 |

* cited by examiner

*Primary Examiner* — Jirapon Tulop
(74) *Attorney, Agent, or Firm* — Barta Jones, PLLC

(57) ABSTRACT

Example embodiments of the present disclosure relate to methods, devices, apparatuses and computer readable storage medium for a low energy indication. The method comprises: transmitting, to a second apparatus, an energy harvesting capability indication of the first apparatus; receiving, from the second apparatus, a configuration of a low energy event report of the first apparatus at least indicating one or more energy level thresholds; and transmitting, to the second apparatus, the low energy event report to the second apparatus at least based on the configuration.

20 Claims, 7 Drawing Sheets

LOW ENERGY INDICATION FOR INTERNET OF THINGS DEVICES

FIELDS

Various example embodiments of the present disclosure generally relate to the field of telecommunication and in particular, to methods, devices, apparatuses and computer readable storage medium for low energy indication for internet of things (IoT) device, especially for emergency low energy indication for ambient IoT devices.

BACKGROUND

Regarding IoT applications, the 3rd Generation Partnership Project (3GPP) has specified narrow band IoT (NB-IoT)/enhanced Machine-Type Communication (eMTC) and new radio (NR) reduced capability (RedCap) before release 18 to satisfy the requirements on low cost and low power devices for wide area IoT communication.

These IoT devices usually consume tens or hundreds of milliwatts power during transceiving, while the cost is very low. However, to achieve the internet of everything (IoE) devices with ten or even a hundred times lower cost and power consumption are needed, especially for a large number of applications requiring batteryless devices.

SUMMARY

In a first aspect of the present disclosure, there is provided a first apparatus. The first apparatus comprises at least one processor; and at least one memory storing instructions that, when executed by the at least one processor, cause the first apparatus at least to: transmit, to a second apparatus in a radio resource control (RRC) connected mode, an energy harvesting capability indication of the first apparatus; receive, from the second apparatus, a configuration of a low energy event report of the first apparatus at least indicating one or more energy level thresholds; and transmit, to the second apparatus, the low energy event report to the second apparatus at least based on the configuration.

In a second aspect of the present disclosure, there is provided a second apparatus. The second apparatus comprises at least one processor; and at least one memory storing instructions that, when executed by the at least one processor, cause the second apparatus at least to: receive, from a first apparatus, an energy harvesting capability indication of the first apparatus; transmit, to the first apparatus, a configuration of a low energy event report of the first apparatus at least indicating one or more energy level thresholds; and receive a low energy event report from the first apparatus.

In a third aspect of the present disclosure, there is provided a method. The method comprises: transmitting, to a second apparatus, an energy harvesting capability indication of the first apparatus; receiving, from the second apparatus, a configuration of a low energy event report of the first apparatus at least indicating one or more energy level thresholds; and transmitting, to the second apparatus, the low energy event report to the second apparatus at least based on the configuration.

In a fourth aspect of the present disclosure, there is provided a method. The method comprises: receiving, from a first apparatus, an energy harvesting capability indication of the first apparatus; transmitting, to the first apparatus, a configuration of a low energy event report of the first apparatus at least indicating one or more energy level thresholds; and receiving a low energy event report from the first apparatus.

In a fifth aspect of the present disclosure, there is provided a first apparatus. The first apparatus comprises means for transmitting, to a second apparatus, an energy harvesting capability indication of the first apparatus; means for receiving, from the second apparatus, a configuration of a low energy event report of the first apparatus at least indicating one or more energy level thresholds; and means for transmitting, to the second apparatus, the low energy event report to the second apparatus at least based on the configuration.

In a sixth aspect of the present disclosure, there is provided a second apparatus. The second apparatus comprises means for receiving, from a first apparatus, an energy harvesting capability indication of the first apparatus; means for transmitting, to the first apparatus, a configuration of a low energy event report of the first apparatus at least indicating one or more energy level thresholds; and means for receiving a low energy event report from the first apparatus.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
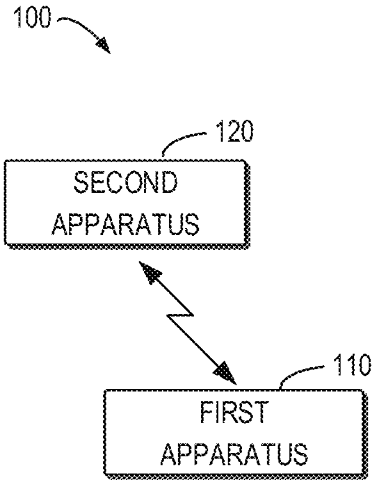
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

Example Environment

FIG. 1 illustrates an example communication environment 100 in which example embodiments of the present disclosure can be implemented. The communication environment 100 comprises a first apparatus 110 and a second apparatus 120, which may communicate with each other.

In the following, for the purpose of illustration, some example embodiments are described with the first apparatus 110 operating as a terminal device and the second apparatus 120 operating as a network device. However, in some example embodiments, operations described in connection with a terminal device may be implemented at a network device or other device, and operations described in connection with a network device may be implemented at a terminal device or other device.

It is to be understood that the number of network devices and terminal devices shown in FIG. 1 is given for the purpose of illustration without suggesting any limitations. The communication network 100 may include any suitable number of network devices and terminal devices.

In some example embodiments, if the first apparatus 110 is a terminal device and the second apparatus 120 is a network device, a link from the second apparatus 120 to the first apparatus 110 is referred to as a downlink (DL), and a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

The number of IoT connections has been growing rapidly in recent years and is predicted to be hundreds of billions in the future. With more and more 'things' expected to be interconnected for improving production efficiency and increasing comforts of life, it demands further reduction of size, cost, and power consumption for IoT devices.

Regular replacement of battery for all the IoT devices is impractical due to the tremendous consumption of materials and manpower. It has become a trend to use energy harvested from environments to power IoT devices for self-sustainable communications, especially in applications with a huge number of devices (e.g., identification (ID) tags and sensors).

There are some issues from aspects from 3GPP technologies or non-3GPP technologies.

For example, the most critical issue with existing 3GPP technologies for the target use cases is the capability of cooperating with energy harvesting considering limited device size. Cellular devices usually consume tens or even hundreds of milliwatts power for transceiver processing. Taking NB-IoT module for example, the typical current consumption for receive processing is about 60 mA with supply voltage higher than 3.1V, while 70 mA for transmitting processing at 0 dBm transmit power. Furthermore, the output power provided by typical energy harvester is mostly below 1 milliwatt, considering the small size of a few square centimeters for practical devices. Since the available power is far less than the consumed power, it is impractical to power cellular devices directly by energy harvesting in most cases.

One possible solution is to integrate energy harvesting with rechargeable battery or supercapacitor. However, there are still a few problems to be solved.

Firstly, both rechargeable battery and supercapacitor may suffer from shortened lifetime in practical cases. It is hard to provide constant charging current or voltage by energy harvesting, while longtime continuous charging is needed due to the very small output power from energy harvester. Inconstant charging current and longtime continuous charging are both harmful to battery life. For supercapacitor, its lifetime will be significantly reduced in high temperature environments (e.g., less than 3 years at 50 degrees centigrade).

Secondly, device size will be significantly increased. As small size button battery can only provide current of a few tens of milliamps, battery with much larger size (e.g., AA battery) is usually used to power cellular devices, whose size can be even larger than the module itself. To store energy for a proper duration of working (e.g., one second), the required capacitance of a supercapacitor is at the level of a hundred mill-farads. The size of such supercapacitors may be larger than an NB-IoT module.

Thirdly, both rechargeable batteries and supercapacitors can be more expensive than the module itself. Even purchased in large quantities, the cost of a suitable battery or supercapacitor may reach one or a few dollars, which nearly doubles the cost of the device.

In the aspect of non-3GPP technologies, Radio Frequency Identification (RFID) is the most well-known technology supporting battery less tags (devices). The power consumption of commercial passive RFID tags can be as low as 1 microwatt. The key techniques enabling such low power consumption are envelope detection for downlink data reception, and backscatter communication for uplink data transmission. RFID is designed for short-range communications, whose typical effective range is less than 10 meters. As the air interface of RFID almost remains unchanged several years, the too-simple transmission scheme becomes the obstacle of improving its link budget and capability of supporting scalable network.

Attracted by the extremely low power consumption of backscatter communication, many non-3GPP technologies begin to put efforts into related research, such as Wi-Fi, Bluetooth, Ultra-Wide Band (UWB), and Long Range Radio (LORA). Various research show that a few or tens of microwatts power consumption can be supported for passive tags based on or with small modifications to the above air interfaces. A significant proportion of the studies are targeting at long range communication. Among them, a LoRa tag implemented with commercial off-the-shelf components can send its sensing data to the receiver of 381 meters away.

Currently, most of the studies are focusing on independent detailed techniques for various optimization targets. It is hard to see a comprehensive system design fully meeting the requirements of the target use cases. However, the standardization of those technologies is agile and quick, as the industries usually follow some de facto standards. It means that many products in the market will follow even a private standard once it shows competitiveness in some applications.

Furthermore, a passive radio is a device that harnesses energy from wireless signals sent on specific carriers and/or bandwidths and charges a simple circuitry that, once activated, it will emit/reflect a signal which encodes at least the ID of the passive radio. The typical system architecture around a passive radio consists of an activator, a passive radio and a reader. The activator may send an activation signal targeted at waking up the passive radio. The passive radio may harness energy over a range of frequencies and listens for activation signals. Once such a signal is detected, the passive radio emits/reflects a signal which is specific to that radio ID. The reader may be a device that listens and detects the passive radio signals. The reader may or may not be collocated with the activator.

The study item for the following main two types of devices have been identified as below:

TABLE 1

| |
|---|
| In terms of energy storage, the study will consider the following device characteristics: |
| (Passive) Pure batteryless devices with no energy storage capability at all, and completely dependent on the availability of an external source of energy |
| (Semi-Passive) Devices with limited energy storage capability that do not need to be replaced or recharged manually. |
| Device categorization based on corresponding characteristics (e.g., energy source, energy storage capability, passive/active transmission, etc.) may be discussed during the study, in relation with the relevant use cases. The device's peak power consumption shall be limited by its practical form factor for the intended use cases, and shall consider its energy source. |

The objectives of this study item can be grouped into three areas: (i) deployment scenarios; (ii) design targets and (iii) performance assessment. In terms of deployment scenarios it was highlighted the operation in unlicensed spectrum as below

TABLE 2

| |
|---|
| Identify the suitable deployment scenarios and their characteristics, at least for the use cases/services agreed in SA1's "Study on Ambient power-enabled internet of Things", comprising among at least the following aspects: |
| Indoor/outdoor environment |
| Base station characteristics, e.g., macro/micro/pico cells-based deployments |
| Connectivity topologies, including which node(s), e.g., base station, UE, relay, repeater, etc. can communicate with target devices |
| TDD/FDD, and frequency bands in licensed or unlicensed spectrum |
| Coexistence with UEs and infrastructure in frequency bands for existing 3GPP technologies |
| Device originated and/or device terminated traffic assumption |

NOTE:
There can be more than one deployment scenario identified for a use case, and a deployment scenario may be common to more than one use case.
NOTE:
Where more than one deployment scenario is identified for a use case, the trade-offs between them should also be studied.
NOTE:
The study shall not prioritize deployment aspects that should be coordinated with SA, e.g., public or private network, with or without CN connection.
NOTE:
A representative use case can be studied for a group of use cases that have similar requirements.

it was agreed to extend the initial device classification and focus on three device types, namely:

Device A: Passive device with NO energy storage

Device B: Passive device with energy storage.

Device C: Active device with energy storage

Design targets for power consumptions arc:

Device A≤10 μW.

Device A<Device B<Device C.

Device C≤1 mW

Device complexity design target are:

Device A: Comparable to UHF RFID.

Device A≤Device B≤Device C,

Device C: Orders-of-magnitude lower than NB-IoT

The nature of ultra-low power devices poses a challenge to the current cellular communication design approach, for which the operation is based on several energy intensive signaling procedures. Namely, when the operation of these devices is dependent on energy harvesting, then it is expected that the amount of energy that the device has available as its energy storage will vary over time.

This creates the challenge that in some time periods, where the device (e.g., the Type C device) does not have enough energy to support the full signaling exchange procedures such as initial access establishment (synchronization signal/physical broadcast channel block (SSB) sweep and 2-step, 4-step random access), Hybrid Automatic Repeat Request (HARQ), scheduling request (SR), channel state information (CSI) reporting, SSB/CSI reference signal (CSI-RS) monitoring and reporting and/or RRC (re) configurations. While at other times, the devices will have sufficient energy storage to support (some or all) of these procedures.

Presently, the network (NW) does not have any mechanisms to determine the current energy state of the device energy storage and hence cannot take this into account in the radio resource management and signaling procedures. This might cause an unexpected break of communication when the energy storage is insufficient to handle the signaling procedures, or at least a missed opportunity for resource efficiency enhancements, when the energy storage allows for the NW desired procedures.

Therefore, a mechanism that allows the device to report to the NW that it is experiencing a low energy event is expected.

According to some example embodiments of the present disclosure, there is provided a solution for a low energy indication. In this solution, the first apparatus 110 in an RRC connected mode, transmits, to a second apparatus 120, an energy harvesting capability indication of the first apparatus 110 and receives, from the second apparatus 120, a configuration of a low energy event report of the first apparatus 110 at least indicating one or more energy level thresholds. Then the first apparatus transmits, to the second apparatus 120, the low energy event report to the second apparatus at least based on the configuration.

The solution of the present disclosure allows the NW to either adapt the UE configuration (e.g., when operating in RRC Idle/Inactive and RRC connected so that the UE (e.g., a NW authenticated A-IoT Device Type C) can better cope with the low energy state) or trigger an emergency RF charging.

Example embodiments of the present disclosure will be described in detail below with reference to the accompanying drawings.

Figure 2:
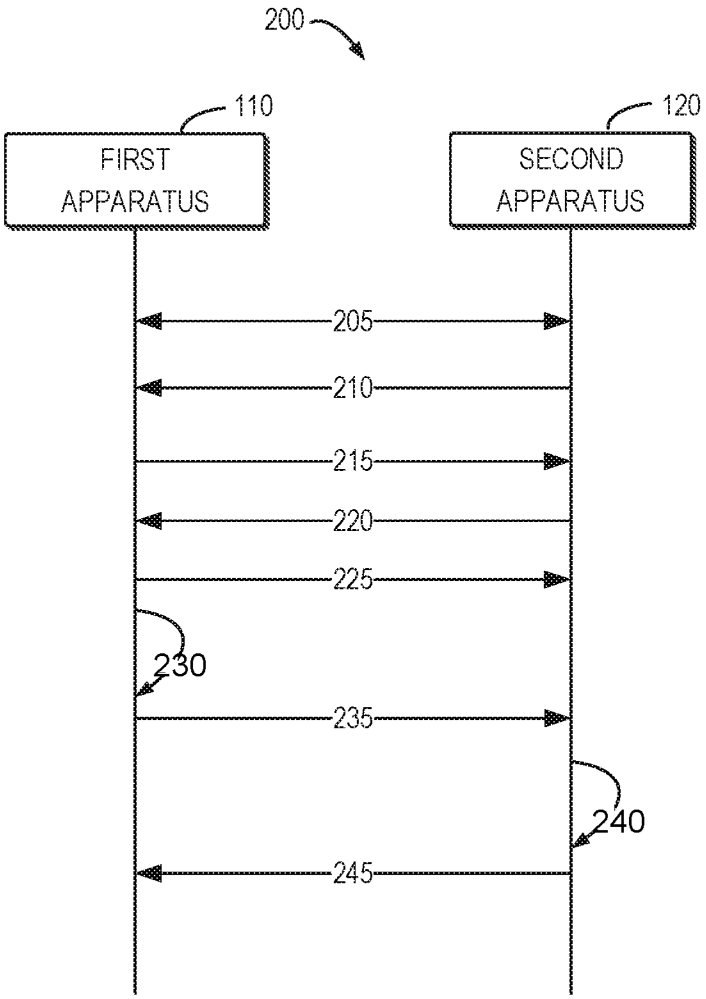
FIG. 2 illustrates a signaling chart for a low energy indication according to some example embodiments of the present disclosure.

FIG. 2 illustrates a signaling chart 200 for a low energy indication according to some example embodiments of the present disclosure. For the purposes of discussion, the signaling chart 200 will be discussed with reference to FIG. 1, for example, by using the first apparatus 110 (e.g., a UE) and the second apparatus 120 (e.g., a gNB).

As shown in FIG. 2, when the first apparatus 110 is in an RRC idle/inactive mode, an RRC connection establishment is performed (205) between the first apparatus 110 and the second apparatus 120. Then the first apparatus 110 transitions from an RRC idle/inactive mode to an RRC connected.

Then the capability of the first apparatus 110 can be exchange between the first apparatus 110 and the second apparatus 120.

In some embodiments, the second apparatus 120 may transmit (210), to the first apparatus 110, a request of a capability report of the first apparatus. Then the first apparatus 110 transmit (215), to the second apparatus 120, an indication of energy harvesting capability the first apparatus 110 indicating, as an example, the first apparatus 110 is capable of energy harvesting.

As another example, the indication of energy harvesting capability of the first apparatus 110 may indicate the first apparatus 110 is capable of RF energy harvesting. It is also possible that the indication of energy harvesting capability of the first apparatus 110 may indicate the power of the first apparatus 110 is mainly coming from the energy harvesting with limited battery capability.

Then the second apparatus 120 may initiate an RRC reconfiguration procedure. The second apparatus 120 transmit (220), to the first apparatus 110 e.g., via an RRC reconfiguration message, a configuration of a low energy event report of the first apparatus 110. That is, the second apparatus 120 configures the first apparatus 110 to be able to report the low energy level indication.

In some embodiments, the configuration may indicate one or more energy level thresholds, which may be used for the first apparatus 110 to determine whether the first apparatus 110 is in a low energy state. For example, the configuration may indicate a first energy level threshold and a second energy level threshold. The first energy level threshold may be higher than the second energy level threshold.

Furthermore, the configuration may further comprise a period for the first apparatus 110 to perform the low energy event report, an energy event corresponding to different energy level thresholds, information associated with an energy state of the first apparatus 110 that is required by the second apparatus for the specific energy level.

Moreover, the configuration may further indicate a type of resources for the first apparatus to perform the low energy event report corresponding to the specific energy level of the first apparatus 110.

It is also possible that the configuration may indicate the first apparatus 110 to use a simple indication (e.g., a flag or a one-bit indication) to indicate whether the first apparatus is in a low energy state.

After transmitting (225) an RRC reconfiguration complete message to the second apparatus 120, the first apparatus 110 may, based on the received configuration, perform the monitoring of the device available energy.

In this case, if the first apparatus 110 determines the available energy is below the first energy level threshold but above the second energy level threshold, the first apparatus 110 may determine (230) that a low energy event occurs at the first apparatus 110.

Then the first apparatus 110 may transmit (235) a low energy event report indicating the low energy event to the second apparatus 120, e.g., as part of the UE assistance information RRC message (L3).

In addition to the low energy event, the first apparatus 110 may also determine information associated with an energy state of the first apparatus 110 that is required by the second apparatus for the low energy event, which may include an amount of time (i.e., timeline) until to enter a low energy state based on a current energy consumption and the available energy at the first apparatus 110. The determined information may also be transmitted from the first apparatus 110 to the second apparatus 120 along with the low energy event report.

In some embodiments, the first apparatus 110 transmit the low energy event report and corresponding information associated with an energy state of the first apparatus 110 to the second apparatus 120 with a configured period indicated in the received configuration. It is also possible that the first apparatus 110 may report the low energy event report immediately when the first apparatus 110 determine the low energy event occurs.

In some embodiments, based on the received configuration, when the first apparatus 110 determine the low energy event occurs, dedicated SR resources can be used by the first apparatus 110 to acquire the resource grant to transmit the report. In some other embodiments, dedicated physical random access channel (PRACH) resources can be used by the first apparatus 110 to acquire the resource grant to transmit the report. Furthermore, when the first apparatus 110 determine the low energy event occurs, a resource grant to transmit the low energy event report may be obtained by overriding a priority of SR associated with either control plane exchanges or user plane exchanges.

After receiving the low energy event report, the second apparatus 120 may determines (240) what is the operation level to transition the first apparatus 110 to cope with the low/lack of energy, e.g., the low energy event at the first apparatus 110.

In some embodiments, the second apparatus 120 may transmit an RRC release message to the first apparatus 110 to cause the first apparatus 110 to transit to an RRC inactive state. In some cases, the second apparatus 120 may indicate the first apparatus 110 to transit to an RRC inactive state with small data transmission (SDT) configuration.

In some embodiments, the second apparatus 120 may also reconfigure, to the first apparatus 110, the CORESET and search space including the activation of PDCCH skipping.

In some embodiments, the second apparatus 120 may deactivate HARQ in bandwidth part (BWP), which allows the first apparatus 110 to deactivate the HARQ buffers and includes the deactivation of the physical uplink control channel (PUCCH) resources associated HARQ reporting.

In some embodiments, the second apparatus 120 may reconfigure the BWP to a smaller BWP as this will lead to reduce significantly the power consumption associated with monitoring the physical downlink control channel (PDCCH).

In some embodiments, the second apparatus 120 may configure a relaxation of the radio link and beam failure (RLF) detection measurements.

Last but not the least, the second apparatus 120 may configure DL resources to be used by the first apparatus 110 to enable RF charging of the first apparatus 110 (when the first apparatus 110 supports RF charging).

Then the second apparatus 120 may transmit (245) to the first apparatus 110 the determined configuration(s) and/or indication of the DL resources where the RF charging will take place.

Figure 3:
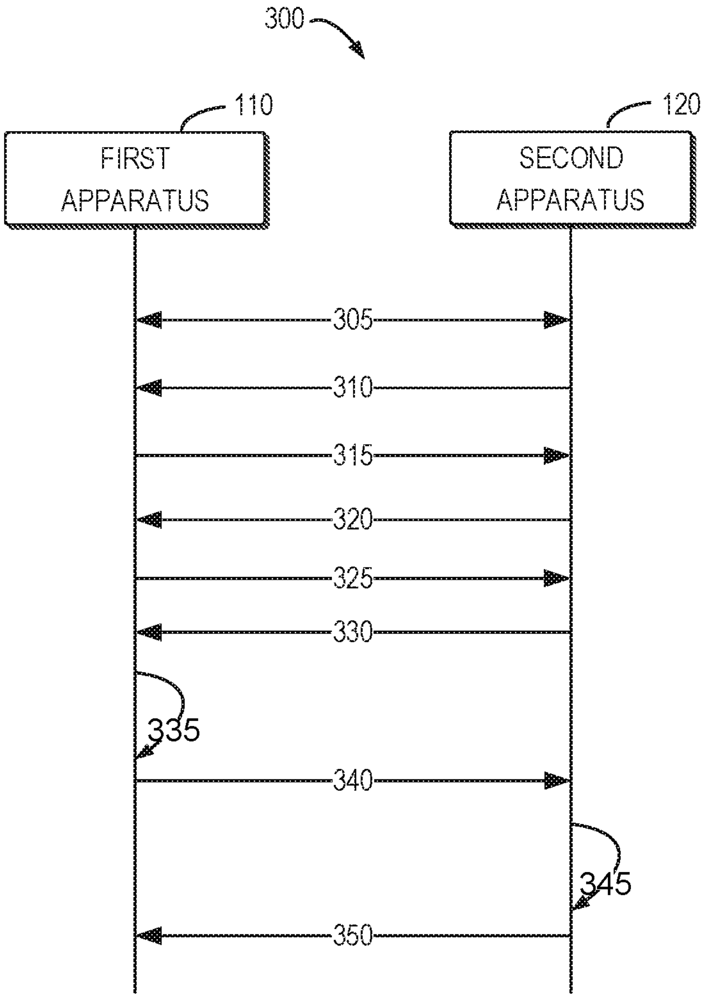
FIG. 3 illustrates a signaling chart for a low energy indication according to some example embodiments of the present disclosure.

FIG. 3 illustrates a signaling chart 300 for a low energy indication according to some example embodiments of the present disclosure. For the purposes of discussion, the signaling chart 300 will be discussed with reference to FIG. 1, for example, by using the first apparatus 110 (e.g., a UE) and the second apparatus 120 (e.g., a gNB).

Similar with the process as shown in FIG. 2, when the first apparatus 110 is in an RRC idle/inactive mode, an RRC connection establishment is performed (305) between the first apparatus 110 and the second apparatus 120. Then the first apparatus 110 transitions from an RRC idle/inactive mode to an RRC connected.

Then the capability of the first apparatus 110 can be exchange between the first apparatus 110 and the second apparatus 120.

In some embodiments, the second apparatus 120 may transmit (310), to the first apparatus 110, a request of a capability report of the first apparatus. Then the first apparatus 110 transmit (315), to the second apparatus 120, an indication of energy harvesting capability the first apparatus 110 indicating, as an example, the first apparatus 110 is capable of energy harvesting.

As another example, the indication of energy harvesting capability of the first apparatus 110 may indicate the first apparatus 110 is capable of RF energy harvesting. It is also possible that the indication of energy harvesting capability of the first apparatus 110 may indicate the power of the first apparatus 110 is mainly coming from the energy harvesting with limited battery capability.

Then the second apparatus 120 may initiate an RRC reconfiguration procedure. The second apparatus 120 transmit (320), to the first apparatus 110 e.g., via an RRC reconfiguration message, a configuration of a low energy event report of the first apparatus 110. That is, the second apparatus 120 configures the first apparatus 110 to be able to report the low energy level indication.

In some embodiments, the configuration may indicate one or more energy level thresholds, which may be used for the first apparatus 110 to determine whether the first apparatus 110 is in a low energy state. For example, the configuration may indicate a first energy level threshold and a second energy level threshold. The first energy level threshold may be higher than the second energy level threshold.

Furthermore, the configuration may further comprise a period for the first apparatus 110 to perform the low energy event report, an energy event corresponding to different energy level thresholds, information associated with an energy state of the first apparatus 110 that is required by the second apparatus for the specific energy level.

Moreover, the configuration may further indicate a type of resources for the first apparatus to perform the low energy event report corresponding to the specific energy level of the first apparatus 110.

It is also possible that the configuration may indicate the first apparatus 110 to use a simple indication (e.g., a flag or a one-bit indication) to indicate whether the first apparatus is in a low energy state.

After receiving the configuration, the first apparatus 110 may transmit (325) an RRC reconfiguration complete message to the second apparatus 120.

In this case, then the second apparatus 120 may transition the first apparatus 110 to RRC inactive with SDT configuration, e.g., by transmitting (330) an RRC release message to the first apparatus 110.

The first apparatus 110 may, based on the received configuration, perform the monitoring of the device available energy.

In this case, if the first apparatus 110 determines the available energy is below the first energy level threshold but above the second energy level threshold, the first apparatus 110 may determine (335) that a low energy event occurs at the first apparatus 110.

Then the first apparatus 110 may transmit (340) a low energy event report indicating the low energy event to the second apparatus 120. For example, the first apparatus 110 may initiate a SDT where the RRC resume request is appended with a medium access control (MAC) Protocol date unit (PDU) that includes the low energy event report as part of the UE assistance information RRC message (L3). Alternatively, the MAC PDU can instead include a low energy event MAC control element (MAC CE).

In addition to the low energy event, the first apparatus 110 may also determine information associated with an energy state of the first apparatus 110 that is required by the second apparatus for the low energy event, which may include an amount of time (i.e., timeline) until to enter a low energy state based on a current energy consumption and the available energy at the first apparatus 110. The determined information may also be transmitted from the first apparatus 110 to the second apparatus 120 along with the low energy event report.

In some embodiments, the first apparatus 110 transmit the low energy event report and corresponding information associated with an energy state of the first apparatus 110 to the second apparatus 120 with a configured period indicated in the received configuration.

After receiving the low energy event report, the second apparatus 120 may determines (345) what is the operation level to transition the first apparatus 110 to cope with the low/lack of energy, e.g., the low energy event at the first apparatus 110.

In some embodiments, the second apparatus 120 may transit the first apparatus 110 to an RRC inactive state with SDT configuration where only RACH SDT config is included.

In some embodiments, the second apparatus 120 may transit the first apparatus 110 to an RRC inactive state with SDT configuration where the configured grant (CG) SDT configuration is relaxed.

In some embodiments, the second apparatus 120 may transit the first apparatus 110 to an RRC inactive state where the paging occasion monitoring frequency is relaxed.

In some embodiments, the second apparatus 120 may configure DL resources to be used by the first apparatus 110 to enable RF charging of the first apparatus 110 (when the first apparatus 110 supports RF charging).

Then the second apparatus 120 may transmit (350) to the first apparatus 110 the determined configuration(s) and/or indication of the DL resources where the RF charging will take place.

Figure 4:
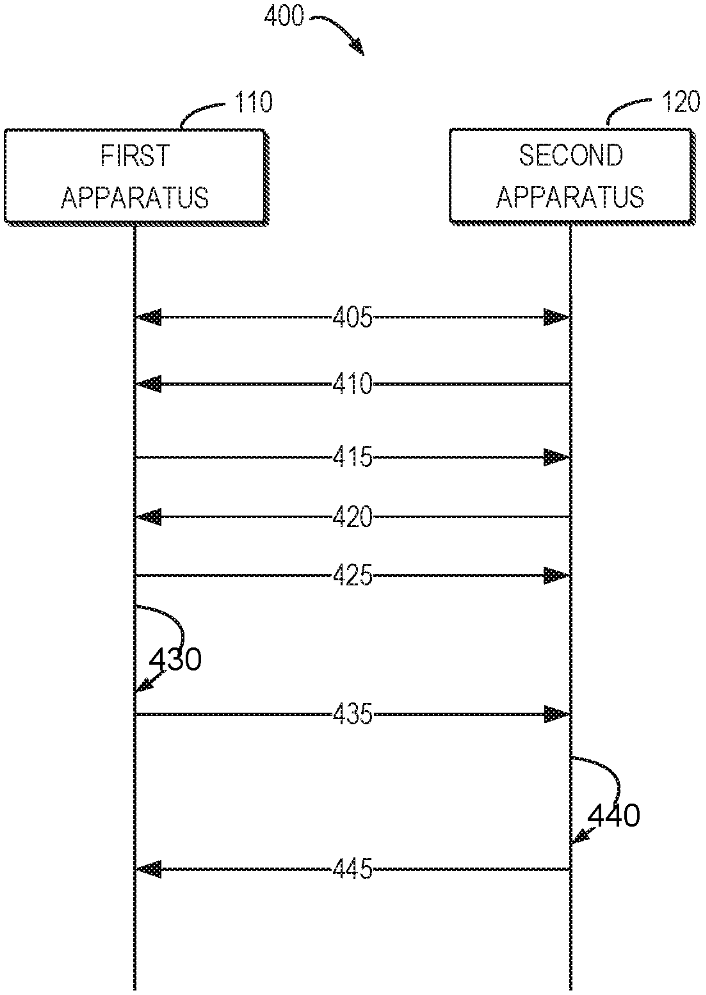
FIG. 4 illustrates a signaling chart for a low energy indication according to some example embodiments of the present disclosure.

FIG. 4 illustrates a signaling chart 400 for a low energy indication according to some example embodiments of the present disclosure. For the purposes of discussion, the signaling chart 400 will be discussed with reference to FIG. 1, for example, by using the first apparatus 110 (e.g., a UE) and the second apparatus 120 (e.g., a gNB).

Similar with the processes as shown in FIGS. 2 and 3, when the first apparatus 110 is in an RRC idle/inactive mode, an RRC connection establishment is performed (405) between the first apparatus 110 and the second apparatus 120. Then the first apparatus 110 transitions from an RRC idle/inactive mode to an RRC connected.

Then the capability of the first apparatus 110 can be exchange between the first apparatus 110 and the second apparatus 120.

In some embodiments, the second apparatus 120 may transmit (410), to the first apparatus 110, a request of a capability report of the first apparatus. Then the first apparatus 110 transmit (415), to the second apparatus 120, an indication of energy harvesting capability the first apparatus 110 indicating, as an example, the first apparatus 110 is capable of energy harvesting.

As another example, the indication of energy harvesting capability of the first apparatus 110 may indicate the first apparatus 110 is capable of RF energy harvesting. It is also possible that the indication of energy harvesting capability of the first apparatus 110 may indicate the power of the first apparatus 110 is mainly coming from the energy harvesting with limited battery capability.

Then the second apparatus 120 may initiate an RRC reconfiguration procedure. The second apparatus 120 transmit (420), to the first apparatus 110 e.g., via an RRC reconfiguration message, a configuration of a low energy event report of the first apparatus 110. That is, the second apparatus 120 configures the first apparatus 110 to be able to report the low energy level indication.

In some embodiments, the configuration may indicate one or more energy level thresholds, which may be used for the first apparatus 110 to determine whether the first apparatus 110 is in a low energy state. For example, the configuration may indicate a first energy level threshold and a second energy level threshold. The first energy level threshold may be higher than the second energy level threshold.

Furthermore, the configuration may further comprise a period for the first apparatus 110 to perform the low energy event report, an energy event corresponding to different energy level thresholds, information associated with an energy state of the first apparatus 110 that is required by the second apparatus for the specific energy level.

Moreover, the configuration may further indicate a type of resources for the first apparatus to perform the low energy event report corresponding to the specific energy level of the first apparatus 110.

It is also possible that the configuration may indicate the first apparatus 110 to use a simple indication (e.g., a flag or a one-bit indication) to indicate whether the first apparatus is in a low energy state.

After receiving the configuration, the first apparatus 110 may transmit (425) an RRC reconfiguration complete message to the second apparatus 120.

In this case, the first apparatus 110 may keep in an RRC connected or transit to an RRC inactive state.

Based on the received configuration, the first apparatus 110 may perform the monitoring of the device available energy. If the first apparatus 110 determines the available energy is below the second energy level threshold, the first apparatus 110 may determine (430) that an emergency low energy event occurs at the first apparatus 110.

Then the first apparatus 110 may transmit (435) a low energy event report indicating the emergency low energy event to the second apparatus 120.

In addition to the emergency low energy event, the first apparatus 110 may also determine information associated with an energy state of the first apparatus 110 that is required by the second apparatus for the emergency low energy event, which may include an amount of time (i.e., timeline) until the first apparatus 110 will power off due to lack of energy based on current energy consumption. The determined information may also be transmitted from the first apparatus 110 to the second apparatus 120 along with the low energy event report.

In some embodiments, the transmission of this emergency low energy event can be performed by a transmission of a dedicated PUCCH signal in a SR resource reserved for that purpose during the RRC reconfiguration procedure as described above.

In some embodiments, the transmission of this emergency low energy event can be performed by a transmission of a MAC CE in a PUSCH resource indicated by the second apparatus 120 (as follow up upon the transmission of a dedicated PUCCH signal in a SR resource reserved for that purpose during the RRC reconfiguration procedure).

In some embodiments, the transmission of this emergency low energy event can be performed by a transmission of a dedicated non-contention PRACH preamble in a PRACH opportunity reserved for that purpose during the RRC reconfiguration procedure.

In some embodiments, the transmission of this emergency low energy event can be performed by a transmission of a MAC CE in a physical uplink share channel (PUSCH) resource indicated by the second apparatus 120 (as follow up upon the transmission of a dedicated non-contention PRACH preamble in a PRACH opportunity reserved for that purpose during the RRC reconfiguration procedure).

In some embodiments, the transmission of this emergency low energy event can be performed by a transmission of a MAC CE in a PUSCH resource associated with a (non-) contention PRACH preamble as part of a 2-step RACH procedure.

As a consequence of receiving the emergency low energy event indication, the second apparatus may determine (440) the DL resources to use to provide transmissions directed to first apparatus 110 that will allow it to charge. For example, this determination in terms of time can be based on the "Timeline (i.e., amount of time until) until the first apparatus 110 will power off due to lack of energy based on current energy consumption" indicated in the emergency low energy event report.

Then the second apparatus 120 may transmit (445) of RF DL charging signals to the first apparatus 110.

Based on the solution of the present disclosure, the indication of the device having energy harvesting capabilities (in particular RF harvesting capabilities) may be as part of the UE Capability Information, and the configuration of energy level reporting conditions, i.e., one or more thresholds for low energy reporting and emergency low energy reporting may be set for the UE to determine its current energy state.

Furthermore, the detection, selection of the type of reporting and the actual reporting of low energy event indication L3 (UE Assistance Information) or emergency low energy event indication L1 (dedicated non-contention based PRACH preamble or dedicated SR resource) and/or L2 (Emergency low energy event MAC CE) is enabled, to avoid the latency to report the low energy state of the UE.

The NW may determine corresponding operation for the UE to handle the low energy state, e.g., by initiating an emergency RF charging at the UE side, to avoid the power off of the UE due to exhaustion of the energy.

Figure 5:
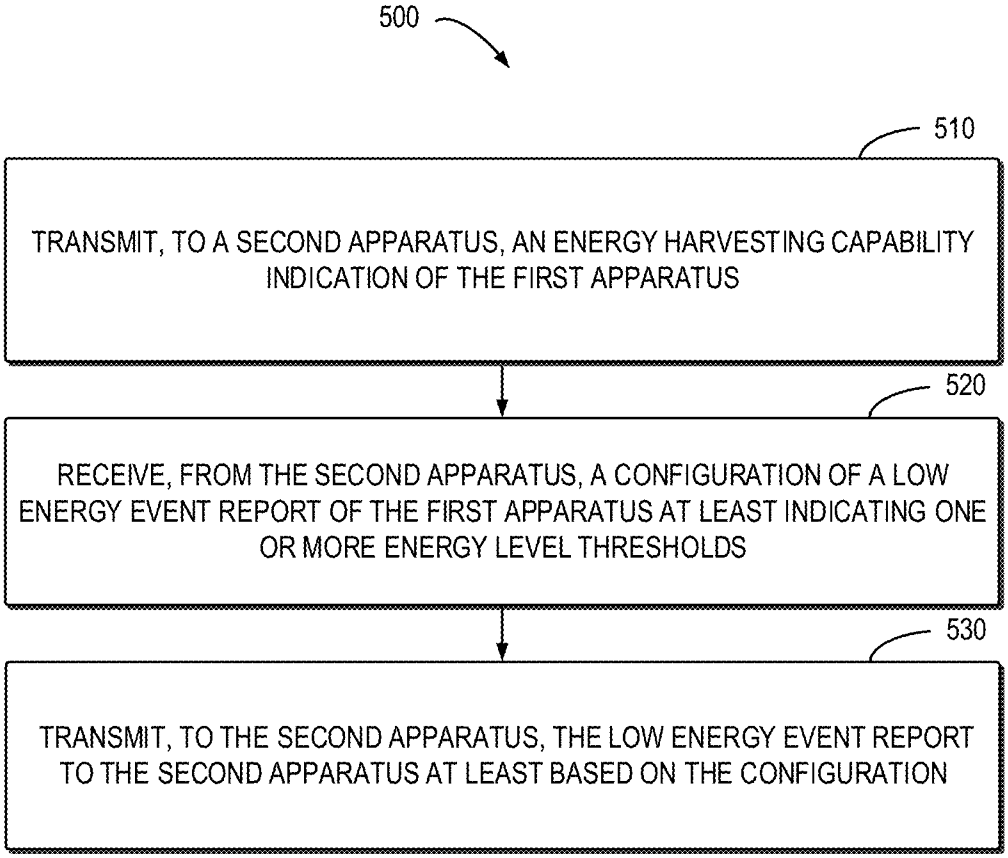
FIG. 5 illustrates a flowchart of a method implemented at a first device according to some example embodiments of the present disclosure.

FIG. 5 shows a flowchart of an example method 500 implemented at a first device in accordance with some example embodiments of the present disclosure. For the purpose of discussion, the method 500 will be described from the perspective of the first apparatus 110 in FIG. 1.

At block 510, the first apparatus 110 transmits, to a second apparatus, an energy harvesting capability indication of the first apparatus.

At block 520, the first apparatus 110 receives, from the second apparatus, a configuration of a low energy event report of the first apparatus at least indicating one or more energy level thresholds.

At block 530, the first apparatus 110 transmits, to the second apparatus, the low energy event report to the second apparatus at least based on the configuration.

In some example embodiments, the method 500 further comprises: in response to receiving, in an RRC connected mode, from the second apparatus, a request of a capability report of the first apparatus, transmitting the energy harvesting capability indication.

In some example embodiments, the method 500 further comprises: receiving the configuration from the second apparatus via a dedicate RRC signaling in an RRC connected mode.

In some example embodiments, the configuration further indicates at least one of the following: a period for the first apparatus to perform the low energy event report, an energy event associated with the one or more energy level thresholds, information associated with an energy state of the first apparatus required by the second apparatus with respect to a specific energy level of the first apparatus, or a type of resources for the first apparatus to perform the low energy event report with respect to the specific energy level of the first apparatus, or an indication of low energy or lack of energy is configured for the low energy event report.

In some example embodiments, the method 500 further comprises: comparing a current energy level of the first apparatus with a first energy level threshold and a second energy level threshold indicated in the configuration, wherein the first energy level threshold is higher than a second energy level threshold; in accordance with a determination that the current energy level is below the first energy level threshold and above the second energy level threshold, determining that there is a low energy event in the first apparatus; and transmitting, to the second apparatus, the low energy event report indicating the low energy event.

In some example embodiments, the method 500 further comprises: determining, based on the configuration, information associated with an energy state of the first apparatus including at least one of: an amount of time until to enter a low energy state based on a current energy consumption, or available energy at the first apparatus; and transmitting, the second apparatus, the determined information associated with the energy state of the first apparatus along with the low energy event report.

In some example embodiments, the method 500 further comprises: in accordance with a determination that the current energy level is below the second energy level threshold, determining that there is an emergency low energy event in the first apparatus; and transmitting, to the second apparatus, the low energy event report indicating the emergency low energy event.

In some example embodiments, the method 500 further comprises: determining, based on the configuration, information associated with an energy state of the first apparatus including an amount of time until power off of the first apparatus due to lack of energy based on a current energy consumption; and transmitting, the second apparatus, the determined information associated with the energy state of the first apparatus along with the low energy event report.

In some example embodiments, the method 500 further comprises: in accordance with a determination that the current energy level is below the second energy level threshold, determining that there is no low energy event in the first apparatus.

In some example embodiments, the method 500 further comprises: obtaining, based on the configuration and an energy event occurring at the first apparatus, a resource grant to transmit the low energy event report by at least one of the following: using dedicated scheduling request, SR, resources, using dedicated random access resources, using medium access control-control element, or overriding a priority of SR associated with either control plane exchanges or user plane exchanges.

In some example embodiments, the method 500 further comprises: transmitting the low energy event report to the second apparatus via an RRC signaling.

In some example embodiments, the method 500 further comprises: in response to entering an RRC inactive mode, transmitting the low energy event report to the second apparatus via an RRC resume request by initiating a small data transmission, SDT.

In some example embodiments, the method 500 further comprises: receiving, from the second apparatus, an indication for the first apparatus to handle the energy event.

In some example embodiments, a low energy event occurs at the first apparatus and the first apparatus is in the RRC connected mode, and wherein the indication for the first apparatus to handle the energy event indicates at least one of the following: a deactivation of hybrid automatic repeat request in bandwidth part, or a configuration of downlink resources to be used to enable radio frequency charging of the first apparatus.

In some example embodiments, a low energy event occurring at the first apparatus is reported to the second apparatus via an SDT, and wherein the indication for the first apparatus to handle the energy event indicates at least one of the following: the first apparatus is transit to an RRC inactive mode where a paging occasion monitoring frequency is relaxed; or a configuration of downlink resources to be used to enable radio frequency charging of the first apparatus.

In some example embodiments, an emergency energy event occurs at the first apparatus, wherein the indication for the first apparatus to handle the energy event indicates the first apparatus is allowed to perform an emergency radio frequency charge.

In some example embodiments, the energy harvesting capability indication indicates at least one of the following: the first apparatus is capable of energy harvesting;

the first apparatus is capable of radio frequency energy harvesting; or powering of the first apparatus is coming from the energy harvesting with limited battery capability.

In some example embodiments, the first apparatus comprises a terminal device and the second apparatus comprises a network device.

Figure 6:
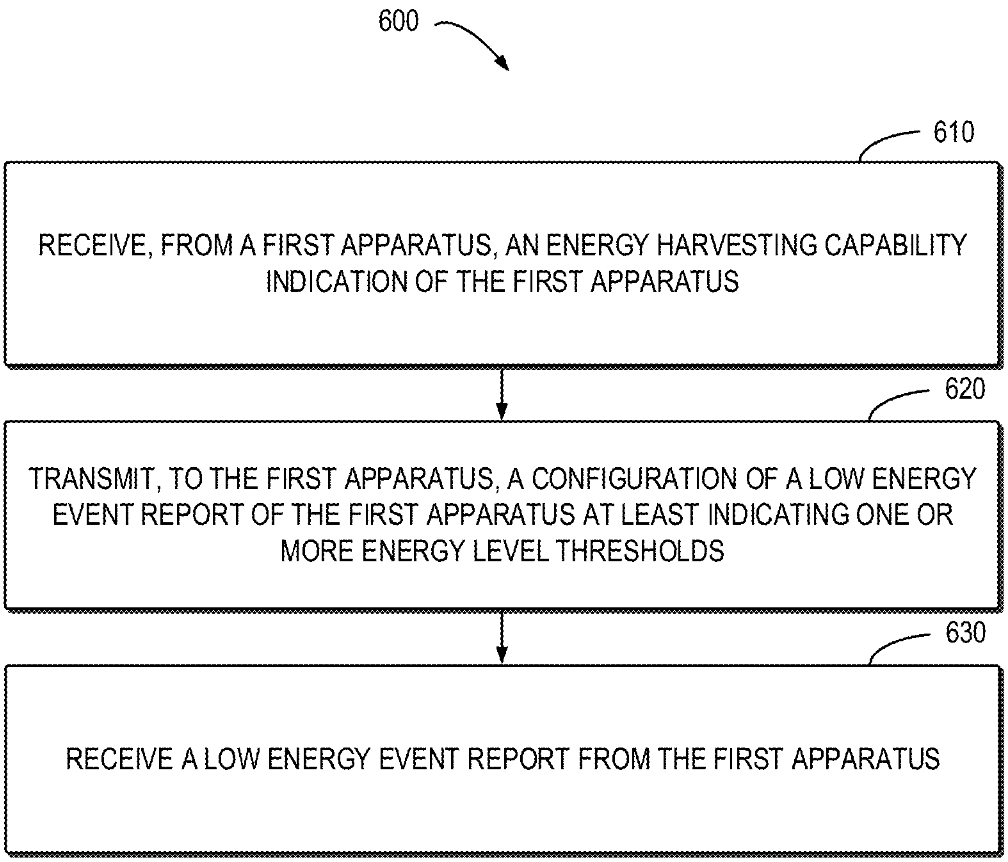
FIG. 6 illustrates a flowchart of a method implemented at a second device according to some example embodiments of the present disclosure.

FIG. 6 shows a flowchart of an example method 600 implemented at a second device in accordance with some example embodiments of the present disclosure. For the purpose of discussion, the method 600 will be described from the perspective of the second apparatus 120 in FIG. 1.

At block 610, the second apparatus 120 receives, from a first apparatus, an energy harvesting capability indication of the first apparatus.

At block 620, the second apparatus 120 transmits, to the first apparatus, a configuration of a low energy event report of the first apparatus at least indicating one or more energy level thresholds.

At block 630, the second apparatus 120 receives a low energy event report from the first apparatus.

In some example embodiments, the method 600 further comprises: transmitting, to the first apparatus in an RRC connected mode, a request of a capability report of the first apparatus.

In some example embodiments, the method 600 further comprises: transmitting, to the first apparatus in an RRC connected mode, the configuration via a dedicate RRC signaling.

In some example embodiments, the configuration further indicates at least one of the following: a period for the first apparatus to perform the low energy event report, an energy event associated with the one or more energy level thresholds, information associated with an energy state of the first apparatus required by the second apparatus with respect to a specific energy level of the first apparatus, or a type of resources for the first apparatus to perform the low energy event report with respect to the specific energy level of the first apparatus, or an indication of low energy or lack of energy is configured for the low energy event report.

In some example embodiments, the configuration further indicates: an energy level below a first energy level threshold and above a second energy level threshold corresponds to a low energy event, and an energy level below the second energy level threshold corresponds to an emergency low energy event.

In some example embodiments, the method 600 further comprises: receiving, from the first apparatus, the low energy event report indicating the low energy event or the emergency low energy event.

In some example embodiments, the method 600 further comprises: receiving, from the first apparatus, information associated with an energy state of the first apparatus along with the low energy event report indicating the low energy event, wherein the information includes at least one of: an amount of time until to enter a low energy state based on a current energy consumption, or available energy at the first apparatus.

In some example embodiments, the method 600 further comprises: receiving, from the first apparatus, information associated with an energy state of the first apparatus along with the low energy event report indicating the emergency low energy event.

In some example embodiments, the method 600 further comprises: receiving, from the first apparatus, information associated with an energy state of the first apparatus along with the low energy event report indicating the low energy event, wherein the information includes an amount of time until power off of the first apparatus due to lack of energy based on a current energy consumption.

In some example embodiments, the configuration further indicates the first apparatus, based on an energy event occurring at the first apparatus, to require a resource grant to transmit the low energy event report by at least one of the following: using dedicated scheduling request, SR, resources, using dedicated random access resources, using medium access control-control element, or overriding a priority of SR associated with either control plane exchanges or user plane exchanges.

In some example embodiments, the method 600 further comprises: receiving the low energy event report from the first apparatus via an RRC signaling.

In some example embodiments, the method 600 further comprises: receiving the low energy event report from the first apparatus via an RRC resume request by a small data transmission, SDT initiated by the first apparatus.

In some example embodiments, the method 600 further comprises: transmitting, to the first apparatus, an indication for the first apparatus to handle the energy event.

In some example embodiments, the method 600 further comprises: in accordance with a determination that the low energy event report indicates the low energy event occurring at the first apparatus and the first apparatus is in the RRC connected mode, transmitting, to the first apparatus, the indication of at least one of the following: a deactivation of hybrid automatic repeat request in bandwidth part, or a configuration of downlink resources to be used to enable radio frequency charging of the first apparatus.

In some example embodiments, the method 600 further comprises: in accordance with a determination that the low energy event report indicating the low energy event is received via an SDT, transmitting, to the first apparatus, the indication of at least one of the following: the first apparatus is transit to an RRC inactive mode where a paging occasion monitoring frequency is relaxed; or a configuration of downlink resources to be used to enable radio frequency charging of the first apparatus.

In some example embodiments, the method 600 further comprises: in accordance with a determination that the low energy event report indicates emergency energy event occurring at the first apparatus, transmitting, to the first apparatus, the indication of an allowance to the first apparatus to perform an emergency radio frequency charge.

In some example embodiments, the energy harvesting capability indication indicates at least one of the following: the first apparatus is capable of energy harvesting; the first apparatus is capable of radio frequency energy harvesting; or powering of the first apparatus is coming from the energy harvesting with limited battery capability.

In some example embodiments, the first apparatus comprises a terminal device and the second apparatus comprises a network device.

In some example embodiments, a first apparatus capable of performing any of the method 500 (for example, the first apparatus 110 in FIG. 1) may comprise means for performing the respective operations of the method 500. The means may be implemented in any suitable form. For example, the means may be implemented in a circuitry or software module. The first apparatus may be implemented as or included in the first apparatus 110 in FIG. 1

In some example embodiments, the first apparatus comprises means for transmitting, to a second apparatus, an energy harvesting capability indication of the first apparatus; means for receiving, from the second apparatus, a configuration of a low energy event report of the first apparatus at least indicating one or more energy level thresholds; and means for transmitting, to the second apparatus, the low energy event report to the second apparatus at least based on the configuration.

In some example embodiments, the first apparatus further comprises: means for in response to receiving, in an RRC connected mode from the second apparatus, a request of a capability report of the first apparatus, transmitting the energy harvesting capability indication.

In some example embodiments, the first apparatus further comprises: means for receiving the configuration from the second apparatus via a dedicate RRC signaling in an RRC connected mode.

In some example embodiments, the configuration further indicates at least one of the following: a period for the first apparatus to perform the low energy event report, an energy event associated with the one or more energy level thresholds, means for information associated with an energy state of the first apparatus required by the second apparatus with respect to a specific energy level of the first apparatus, or a type of resources for the first apparatus to perform the low energy event report with respect to the specific energy level of the first apparatus, or an indication of low energy or lack of energy is configured for the low energy event report.

In some example embodiments, the first apparatus further comprises: means for comparing a current energy level of the first apparatus with a first energy level threshold and a second energy level threshold indicated in the configuration, wherein the first energy level threshold is higher than a second energy level threshold; means for in accordance with a determination that the current energy level is below the first energy level threshold and above the second energy level threshold, determining that there is a low energy event in the first apparatus; and means for transmitting, to the second apparatus, the low energy event report indicating the low energy event.

In some example embodiments, the first apparatus further comprises: means for determining, based on the configuration, information associated with an energy state of the first apparatus including at least one of: an amount of time until to enter a low energy state based on a current energy consumption, or available energy at the first apparatus; and means for transmitting, the second apparatus, the determined information associated with the energy state of the first apparatus along with the low energy event report.

In some example embodiments, the first apparatus further comprises: means for in accordance with a determination that the current energy level is below the second energy level threshold, determining that there is an emergency low energy event in the first apparatus; and means for transmitting, to the second apparatus, the low energy event report indicating the emergency low energy event.

In some example embodiments, the first apparatus further comprises: means for determining, based on the configuration, information associated with an energy state of the first apparatus including an amount of time until power off of the first apparatus due to lack of energy based on a current energy consumption; and means for transmitting, the second apparatus, the determined information associated with the energy state of the first apparatus along with the low energy event report.

In some example embodiments, the first apparatus further comprises: means for in accordance with a determination that the current energy level is below the second energy level threshold, determining that there is no low energy event in the first apparatus.

In some example embodiments, the first apparatus further comprises: means for obtaining, based on the configuration and an energy event occurring at the first apparatus, a resource grant to transmit the low energy event report by at least one of the following: using dedicated scheduling request, SR, resources, using dedicated random access resources, using medium access control-control element, or overriding a priority of SR associated with either control plane exchanges or user plane exchanges.

In some example embodiments, the first apparatus further comprises: means for transmitting the low energy event report to the second apparatus via an RRC signaling.

In some example embodiments, the first apparatus further comprises: means for in response to entering an RRC inactive mode, transmitting the low energy event report to the second apparatus via an RRC resume request by initiating a small data transmission, SDT.

In some example embodiments, the first apparatus further comprises: means for receiving, from the second apparatus, an indication for the first apparatus to handle the energy event.

In some example embodiments, a low energy event occurs at the first apparatus and the first apparatus is in the RRC connected mode, and wherein the indication for the first apparatus to handle the energy event indicates at least one of the following: a deactivation of hybrid automatic repeat request in bandwidth part, or a configuration of downlink resources to be used to enable radio frequency charging of the first apparatus.

In some example embodiments, a low energy event occurring at the first apparatus is reported to the second apparatus via an SDT, and wherein the indication for the first apparatus to handle the energy event indicates at least one of the following: the first apparatus is transit to an RRC inactive mode where a paging occasion monitoring frequency is relaxed; or a configuration of downlink resources to be used to enable radio frequency charging of the first apparatus.

In some example embodiments, an emergency energy event occurs at the first apparatus, wherein the indication for the first apparatus to handle the energy event indicates the first apparatus is allowed to perform an emergency radio frequency charge.

In some example embodiments, the energy harvesting capability indication indicates at least one of the following: the first apparatus is capable of energy harvesting; the first apparatus is capable of radio frequency energy harvesting; or means for powering of the first apparatus is coming from the energy harvesting with limited battery capability.

In some example embodiments, the first apparatus comprises a terminal device and the second apparatus comprises a network device.

In some example embodiments, the first apparatus further comprises means for performing other operations in some example embodiments of the method 500 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 600 (for example, the second apparatus 120 in FIG. 1) may comprise means for performing the respective operations of the method 600. The means may be implemented in any suitable form. For example, the means may be implemented in a circuitry or software module. The second apparatus may be implemented as or included in the second apparatus 120 in FIG. 1.

In some example embodiments, the second apparatus comprises means for receiving, from a first apparatus, an energy harvesting capability indication of the first apparatus; means for transmitting, to the first apparatus, a configuration of a low energy event report of the first apparatus at least indicating one or more energy level thresholds; and means for receiving a low energy event report from the first apparatus.

In some example embodiments, the second apparatus further comprises: means for transmitting, to the first apparatus in an RRC connected mode, a request of a capability report of the first apparatus.

In some example embodiments, the second apparatus further comprises: means for transmitting, to the first apparatus in an RRC connected mode, the configuration via a dedicate RRC signaling.

In some example embodiments, the configuration further indicates at least one of the following: a period for the first apparatus to perform the low energy event report, an energy event associated with the one or more energy level thresholds, means for information associated with an energy state of the first apparatus required by the second apparatus with respect to a specific energy level of the first apparatus, or a type of resources for the first apparatus to perform the low energy event report with respect to the specific energy level of the first apparatus, or an indication of low energy or lack of energy is configured for the low energy event report.

In some example embodiments, the configuration further indicates: an energy level below a first energy level threshold and above a second energy level threshold corresponds to a low energy event, and an energy level below the second energy level threshold corresponds to an emergency low energy event.

In some example embodiments, the second apparatus further comprises: means for receiving, from the first apparatus, the low energy event report indicating the low energy event or the emergency low energy event.

In some example embodiments, the second apparatus further comprises: means for receiving, from the first apparatus, information associated with an energy state of the first apparatus along with the low energy event report indicating the low energy event, wherein the information includes at least one of: an amount of time until to enter a low energy state based on a current energy consumption, or available energy at the first apparatus.

In some example embodiments, the second apparatus further comprises: means for receiving, from the first apparatus, information associated with an energy state of the first apparatus along with the low energy event report indicating the emergency low energy event.

In some example embodiments, the second apparatus further comprises: means for receiving, from the first apparatus, information associated with an energy state of the first apparatus along with the low energy event report indicating the low energy event, wherein the information includes an amount of time until power off of the first apparatus due to lack of energy based on a current energy consumption.

In some example embodiments, the configuration further indicates the first apparatus, based on an energy event occurring at the first apparatus, to require a resource grant to transmit the low energy event report by at least one of the following: using dedicated scheduling request, SR, resources, using dedicated random access resources, using medium access control-control element, or overriding a priority of SR associated with either control plane exchanges or user plane exchanges.

In some example embodiments, the second apparatus further comprises: means for receiving the low energy event report from the first apparatus via an RRC signaling.

In some example embodiments, the second apparatus further comprises: means for receiving the low energy event report from the first apparatus via an RRC resume request by a small data transmission, SDT initiated by the first apparatus.

In some example embodiments, the second apparatus further comprises: means for transmitting, to the first apparatus, an indication for the first apparatus to handle the energy event.

In some example embodiments, the second apparatus further comprises: means for in accordance with a determination that the low energy event report indicates the low energy event occurring at the first apparatus and the first apparatus is in the RRC connected mode, transmitting, to the first apparatus, the indication of at least one of the following: a deactivation of hybrid automatic repeat request in bandwidth part, or a configuration of downlink resources to be used to enable radio frequency charging of the first apparatus.

In some example embodiments, the second apparatus further comprises: means for in accordance with a determination that the low energy event report indicating the low energy event is received via an SDT, transmitting, to the first apparatus, the indication of at least one of the following: the first apparatus is transit to an RRC inactive mode where a paging occasion monitoring frequency is relaxed; or a configuration of downlink resources to be used to enable radio frequency charging of the first apparatus.

In some example embodiments, the second apparatus further comprises: means for in accordance with a determination that the low energy event report indicates emergency energy event occurring at the first apparatus, transmitting, to the first apparatus, the indication of an allowance to the first apparatus to perform an emergency radio frequency charge.

In some example embodiments, the energy harvesting capability indication indicates at least one of the following: the first apparatus is capable of energy harvesting; the first apparatus is capable of radio frequency energy harvesting; or means for powering of the first apparatus is coming from the energy harvesting with limited battery capability.

In some example embodiments, the first apparatus comprises a terminal device and the second apparatus comprises a network device.

In some example embodiments, the second apparatus further comprises means for performing other operations in some example embodiments of the method 600 or the second apparatus 120. In some example embodiments, the means comprises at least one processor; and at least one memory storing instructions that, when executed by the at least one processor, cause the performance of the second apparatus.

Figure 7:
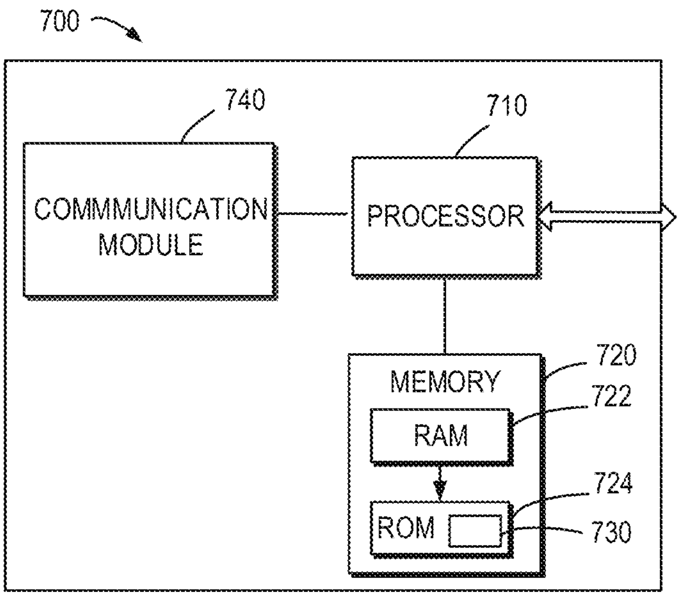
FIG. 7 illustrates a simplified block diagram of a device that is suitable for implementing example embodiments of the present disclosure.

FIG. 7 is a simplified block diagram of a device 700 that is suitable for implementing example embodiments of the present disclosure. The device 700 may be provided to implement a communication device, for example, the first apparatus 110 or the second apparatus 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
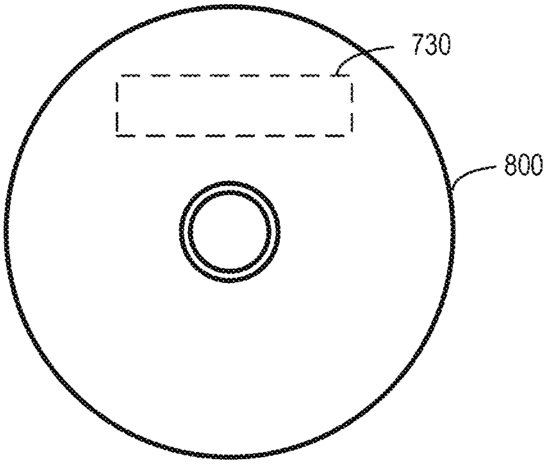
FIG. 8 illustrates a block diagram of an example computer readable medium in accordance with some example embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

transmit, to a second apparatus, an energy harvesting capability indication of the first apparatus, wherein the energy harvesting capability indication indicates that power of the first apparatus is coming from energy harvesting with limited battery capability;

receive, from the second apparatus, a configuration of a low energy event report of the first apparatus at least indicating one or more energy level thresholds, wherein the configuration further indicates the following: a period for the first apparatus to perform the low energy event report, an energy event associated with the one or more energy level thresholds, information associated with an energy state of the first apparatus required by the second apparatus with respect to a specific energy level of the first apparatus, and a type of resources for the first apparatus to perform the low energy event report with respect to the specific energy level of the first apparatus, and an indication of low energy or lack of energy configured for the low energy event report;

compare a current energy level of the first apparatus with a first energy level threshold and a second energy level threshold indicated in the configuration, wherein the first energy level threshold is higher than a second energy level threshold;

in accordance with a determination that the current energy level is below the first energy level threshold and below the second energy level threshold, determine that there is an emergency low energy event in the first apparatus;

determine, based on the configuration, information associated with the energy state of the first apparatus including: an amount of time until power off of the first apparatus due to lack of energy based on a current energy consumption;

obtain, based on the configuration and an energy event occurring at the first apparatus, a resource grant to transmit the low energy event report by the following: using dedicated scheduling request resources, using dedicated random access resources, using medium access control-control element, and overriding a priority of scheduling requests associated with either control plane exchanges or user plane exchanges;

transmit, to the second apparatus, the determined information associated with the energy state of the first apparatus along with the low energy event report indicating the emergency low energy event;

receive, from the second apparatus, an indication for the first apparatus to handle the emergency low energy event, wherein the emergency low energy event occurs at the first apparatus and the first apparatus is in a radio resource control (RRC) connected mode, and wherein the indication for the first apparatus to handle the emergency low energy event indicates the first apparatus is allowed to perform an emergency radio frequency charge; and handle the emergency low energy event by performing the emergency radio frequency charge.

2. The first apparatus of claim 1, wherein the first apparatus is cause to:

in response to receiving, in the RRC connected mode from the second apparatus, a request of a capability report of the first apparatus, transmit the energy harvesting capability indication.

3. The first apparatus of claim 2, wherein the first apparatus is cause to:

receive the configuration from the second apparatus via a dedicated RRC signaling in the RRC mode.

4. The first apparatus of claim 3, wherein the first apparatus is caused to:

transmit the low energy event report to the second apparatus via an RRC signaling.

5. The first apparatus of claim 4, wherein the first apparatus is caused to:

in response to entering an RRC inactive mode, transmit the low energy event report to the second apparatus via an RRC resume request by initiating a small data transmission.

6. The first apparatus of claim 5, wherein the energy harvesting capability indication further indicates the following:

the first apparatus is capable of energy harvesting; and the first apparatus is capable of radio frequency energy harvesting.

7. The first apparatus of claims 6, wherein the first apparatus comprises a terminal device and the second apparatus comprises a network device.

8. A system comprising:

a first apparatus:

at least one processor; and at least one memory storing instructions that, when executed by the at least one processor, cause the first apparatus at least to:

transmit, to a second apparatus, an energy harvesting capability indication of the first apparatus, wherein the energy harvesting capability indication indicates that power of the first apparatus is coming from energy harvesting with limited battery capability;

receive, from the second apparatus, a configuration of a low energy event report of the first apparatus at least indicating one or more energy level thresholds, wherein the configuration further indicates the following: a period for the first apparatus to perform the low energy event report, an energy event associated with the one or more energy level thresholds, information associated with an energy state of the first apparatus required by the second apparatus with respect to a specific energy level of the first apparatus, and a type of resources for the first apparatus to perform the low energy event report with respect to the specific energy level of the first apparatus, and an indication of low energy or lack of energy configured for the low energy event report;

compare a current energy level of the first apparatus with a first energy level threshold and a second energy level threshold indicated in the configuration, wherein the first energy level threshold is higher than a second energy level threshold;

in accordance with a determination that the current energy level is below the first energy level threshold and below the second energy level threshold, determine that there is an emergency low energy event in the first apparatus;

determine, based on the configuration, information associated with the energy state of the first apparatus including: an amount of time until power off of the first apparatus due to lack of energy based on a current energy consumption;

obtain, based on the configuration and an energy event occurring at the first apparatus, a resource grant to transmit the low energy event report by the following: using dedicated scheduling request resources, using dedicated random access resources, using medium access control-control element, and overriding a priority of scheduling requests associated with either control plane exchanges or user plane exchanges;

transmit, to the second apparatus, the determined information associated with the energy state of the first apparatus along with the low energy event report indicating the emergency low energy event;

receive, from the second apparatus, an indication for the first apparatus to handle the emergency low energy event, wherein the emergency low energy event occurs at the first apparatus and the first apparatus is in a radio resource control (RRC) connected mode, and wherein the indication for the first apparatus to handle the emergency low energy event indicates the first apparatus is allowed to perform an emergency radio frequency charge; and handle the emergency low energy event by performing the emergency radio frequency charge.

9. The system of claim 8, wherein the first apparatus is cause to:

in response to receiving, in the RRC connected mode from the second apparatus, a request of a capability report of the first apparatus, transmit the energy harvesting capability indication.

10. The system of claim 9, wherein the first apparatus is cause to:

receive the configuration from the second apparatus via a dedicated RRC signaling in the RRC mode.

11. The system of claim 10, wherein the first apparatus is caused to:

transmit the low energy event report to the second apparatus via an RRC signaling.

12. The system of claim 11, wherein the first apparatus is caused to:

in response to entering an RRC inactive mode, transmit the low energy event report to the second apparatus via an RRC resume request by initiating a small data transmission.

13. The system of claim 12, wherein the energy harvesting capability indication further indicates the following:

the first apparatus is capable of energy harvesting; and the first apparatus is capable of radio frequency energy harvesting.

14. The system of claims 13, wherein the first apparatus comprises a terminal device and the second apparatus comprises a network device.

15. A method comprising:

transmitting, from a first apparatus to a second apparatus, an energy harvesting capability indication of the first apparatus, wherein the energy harvesting capability indication indicates that power of the first apparatus is coming from energy harvesting with limited battery capability;

receiving, from the second apparatus, a configuration of a low energy event report of the first apparatus at least indicating one or more energy level thresholds, wherein the configuration further indicates the following: a period for the first apparatus to perform the low energy event report, an energy event associated with the one or more energy level thresholds, information associated with an energy state of the first apparatus required by the second apparatus with respect to a specific energy level of the first apparatus, and a type of resources for the first apparatus to perform the low energy event report with respect to the specific energy level of the first apparatus, and an indication of low energy or lack of energy configured for the low energy event report;

comparing a current energy level of the first apparatus with a first energy level threshold and a second energy level threshold indicated in the configuration, wherein the first energy level threshold is higher than a second energy level threshold;

in accordance with a determination that the current energy level is below the first energy level threshold and below the second energy level threshold, determining that there is an emergency low energy event in the first apparatus;

determining, based on the configuration, information associated with the energy state of the first apparatus including: an amount of time until power off of the first apparatus due to lack of energy based on a current energy consumption;

obtaining, based on the configuration and an energy event occurring at the first apparatus, a resource grant to transmit the low energy event report by the following: using dedicated scheduling request resources, using dedicated random access resources, using medium access control-control element, and overriding a priority of scheduling requests associated with either control plane exchanges or user plane exchanges;

transmitting, to the second apparatus, the determined information associated with the energy state of the first apparatus along with the low energy event report indicating the emergency low energy event;

receiving, from the second apparatus, an indication for the first apparatus to handle the emergency low energy event, wherein the emergency low energy event occurs at the first apparatus and the first apparatus is in a radio resource control (RRC) connected mode, and wherein the indication for the first apparatus to handle the emergency low energy event indicates the first apparatus is allowed to perform an emergency radio frequency charge; and handling the emergency low energy event by performing the emergency radio frequency charge.

16. The method of claim 15, further comprising: in response to receiving, in the RRC connected mode from the second apparatus, a request of a capability report of the first apparatus, transmitting the energy harvesting capability indication.

17. The method of claim 16, further comprising; receiving the configuration from the second apparatus via a dedicated RRC signaling in the RRC mode.

18. The method of claim 17, further comprising: transmitting the low energy event report to the second apparatus via an RRC signaling.

19. The method of claim 18, further comprising: in response to entering an RRC inactive mode, transmitting the low energy event report to the second apparatus via an RRC resume request by initiating a small data transmission.

20. The method of claim 19, wherein the energy harvesting capability indication further indicates the following:

the first apparatus is capable of energy harvesting; and the first apparatus is capable of radio frequency energy harvesting.

* * * * *